United States Patent
Vance

(10) Patent No.: US 9,708,009 B2
(45) Date of Patent: Jul. 18, 2017

(54) INTEGRAL ROOF/CEILING ASSEMBLY FOR VEHICLES AND MANUFACTURED HOUSING

(71) Applicant: The Macumber Company Inc., Elkhart, IN (US)

(72) Inventor: Dennis R. Vance, Edwardsburg, MI (US)

(73) Assignee: The Macumber Company Inc., Elkhart, IN (US)

( * ) Notice: Subject to any disclaimer, the term of this patent is extended or adjusted under 35 U.S.C. 154(b) by 14 days.

(21) Appl. No.: 14/488,031

(22) Filed: Sep. 16, 2014

(65) Prior Publication Data

US 2015/0084379 A1 Mar. 26, 2015

Related U.S. Application Data

(60) Provisional application No. 61/881,994, filed on Sep. 25, 2013.

(51) Int. Cl.
| | | |
|---|---|---|
| *B62D 25/00* | (2006.01) | |
| *B62D 25/06* | (2006.01) | |
| *B29C 70/70* | (2006.01) | |
| *B62D 29/04* | (2006.01) | |
| *B62D 31/00* | (2006.01) | |
| *B62D 33/04* | (2006.01) | |
| *B29D 99/00* | (2010.01) | |
| *B29K 21/00* | (2006.01) | |
| *B29K 105/16* | (2006.01) | |
| *B29K 509/08* | (2006.01) | |
| *B29L 31/30* | (2006.01) | |

(52) U.S. Cl.
CPC .............. *B62D 25/06* (2013.01); *B29C 70/70* (2013.01); *B29D 99/001* (2013.01); *B62D 29/043* (2013.01); *B62D 31/00* (2013.01); *B62D 33/04* (2013.01); *B29K 2021/003* (2013.01); *B29K 2105/16* (2013.01); *B29K 2509/08* (2013.01); *B29L 2031/3002* (2013.01)

(58) Field of Classification Search
CPC ...... B62D 25/06; B62D 29/043; B62D 31/00; B62D 33/04; B29C 70/70; B29D 99/001
USPC ........................................................ 296/210
See application file for complete search history.

(56) References Cited

U.S. PATENT DOCUMENTS

| | | | | |
|---|---|---|---|---|
| 4,282,697 A | * | 8/1981 | Spielau | E04D 3/351 156/280 |
| 4,507,011 A | * | 3/1985 | Brown | B29C 65/562 156/304.3 |
| 4,597,813 A | * | 7/1986 | Hipkins | E04B 2/86 156/79 |
| 5,218,792 A | * | 6/1993 | Cooper | B62D 33/044 296/203.03 |
| 5,845,458 A | * | 12/1998 | Patel | B60R 13/0225 296/210 |
| 6,586,533 B1 | * | 7/2003 | Landi | C08L 9/00 264/331.13 |
| 6,786,521 B1 | * | 9/2004 | Jaffke | B60R 13/08 296/1.06 |

(Continued)

*Primary Examiner* — Joseph D Pape
(74) *Attorney, Agent, or Firm* — Kevin R. Erdman; Brannon Sowers & Cracraft PC

(57) ABSTRACT

The present invention involves a roofing assembly of a plurality of structural components arranged unattached as a frame in a mold. The frame is sprayed with foam and the structural components are encapsulated within the foam.

20 Claims, 6 Drawing Sheets

(56) References Cited

U.S. PATENT DOCUMENTS

| | | | | |
|---|---|---|---|---|
| 7,543,419 B2* | 6/2009 | Rue | ............ | E04C 2/22 |
| | | | | 52/309.16 |
| 2009/0066120 A1* | 3/2009 | Takishima | ........ | B29C 45/14434 |
| | | | | 296/210 |
| 2013/0200652 A1* | 8/2013 | Havar | ............... | B29C 70/20 |
| | | | | 296/187.03 |

* cited by examiner

INTEGRAL ROOF/CEILING ASSEMBLY FOR VEHICLES AND MANUFACTURED HOUSING

BACKGROUND OF THE INVENTION

Field of the Invention

The present invention relates to roof/ceiling systems for vehicles. More particularly, the field of the invention relates to roofing and ceiling systems for recreational vehicles and manufactured housing.

Description of the Related Art

In addition to traditional vehicles like automobiles and trucks, further advancements in transportation have created mobile living quarters. Some mobile living quarters are vehicles themselves, which operate as a means of transportation as well as a means for habitation. Other mobile living quarters are modularly constructed for transportation before being installed in a permanent, non-mobile location. These types of mobile living quarters are termed a "manufactured home." In many government regulations, manufactured home means a structure, transportable in one or more sections, which, in the traveling mode, is eight body feet or more in width or forty body feet or more in length, or, when erected on site, is three hundred twenty or more square feet, and which is built on a permanent chassis and designed to be used as a dwelling with or without a permanent foundation when connected to the required utilities, and includes the plumbing, heating, air-conditioning, and electrical systems contained therein. Both the mobile living quarters and the manufactured home require a roofing component or roofing system, and such structures often must be customized to the particular arrangement of mobile living quarter or manufactured home.

There is significant labor and expense in creating suitable roofs and ceilings in such dwellings. In particular, mobile living quarters and manufactured housing need roofs and ceilings that can withstand the rigors of transportation. Improvements in such roofing systems are desired.

SUMMARY OF THE INVENTION

The present invention provides a roofing/ceiling system comprised of boards or plates serving as roof parts that are made integrally for use as a component for a recreational vehicle or manufactured housing assembly. The integral component has a plurality of boards, panels, and strips encapsulated in an elastomer material that provides a supporting truss-like structure. In one embodiment, a single roof/ceiling component is integrally formed. In another embodiment, multiple roof/ceiling components are interfit to provide the ceiling and roof structure.

The method of constructing the roofing-ceiling system of embodiments of the present invention involves placing the various truss support pieces in a mold, closing the mold, and injecting the elastomer material to encapsulate the truss support pieces. In one embodiment, pins in the mold provide placement guides for the truss support pieces, and once the elastomer is sufficiently pressurized within the mold the pins are withdrawn so that the truss support pieces are completely encapsulated within the elastomer material. In another embodiment, the truss support pieces may be assembled and connected together, for example by meshing parts or connecting fasteners, and then encapsulated by the elastomer. In still another embodiment, the truss support pieces may be loosely placed within the mold, the mold closed, and the elastomer added to the interior of the mold.

In one embodiment, ⅛" plywood strips are used for the outer surface of the roof and ceiling sections. This embodiment additionally includes 3" square pieces as stand offs from the ⅛" plywood, with further 3" wide strip across the 3" square stand offs. All of these parts go in to a mold. These components are then encapsulated within foam of approximately 1" thick to form the roof section. A second mold is made for the ceiling section wherein ⅛' plywood have 3" squares stand offs with 3" strips that are put in the ceiling mold for the injection of foam and subsequent encapsulation. The foam surrounds the 3" squares and strips to form a structure providing the function of a support truss in addition to binding the various boards, panels, and strips together. The roof and ceiling parts may then be aligned and locked together as an assembly.

Elastomeric material has been used for roofing applications for many years. Elastomeric materials generally resist water and wind penetration, and can be easily rolled or sprayed on the exterior surface of a roof. However, securing the elastomeric material to the roof, and resisting its tearing or disengaging from the surface present difficulties with conventional elastomeric material treatments. The inventor of the present invention discovered that these undesirable qualities may be mitigated or eliminated by pressurizing the elastomeric material, thus enhancing its density, and providing an interior structure to strengthen the body formed by the pressurized elastomeric foam. To describe this in terms of an analogy, the interior structure bolsters the structural integrity of the elastomeric material analogously to how steel bolsters the structural integrity of cement. In other embodiments, the elastomeric material is provided with an interior structure that enhances the structural integrity of the elastomer material. In some embodiments, structural elements are placed within a mold, which is then closed and filled with elastomeric material to form the roofing-ceiling components. In some embodiments, pins within the mold elevate the structural elements off the surface of the mold so that once sufficient pressurized elastomeric material is injected into the mold those structural elements are maintained in position by the pressure of the elastomeric material at which time the pins are removed so that the elastomeric material fills the holes left by the withdrawing pins before setting and curing.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 6 is a perspective view of a recreational vehicle having a roofing-ceiling system according to an embodiment of the invention, wherein FIG. 6A is an expanded cross-sectional view of the overlap of abutting roofing-ceiling components in an embodiment of the present invention.

Figure 1:
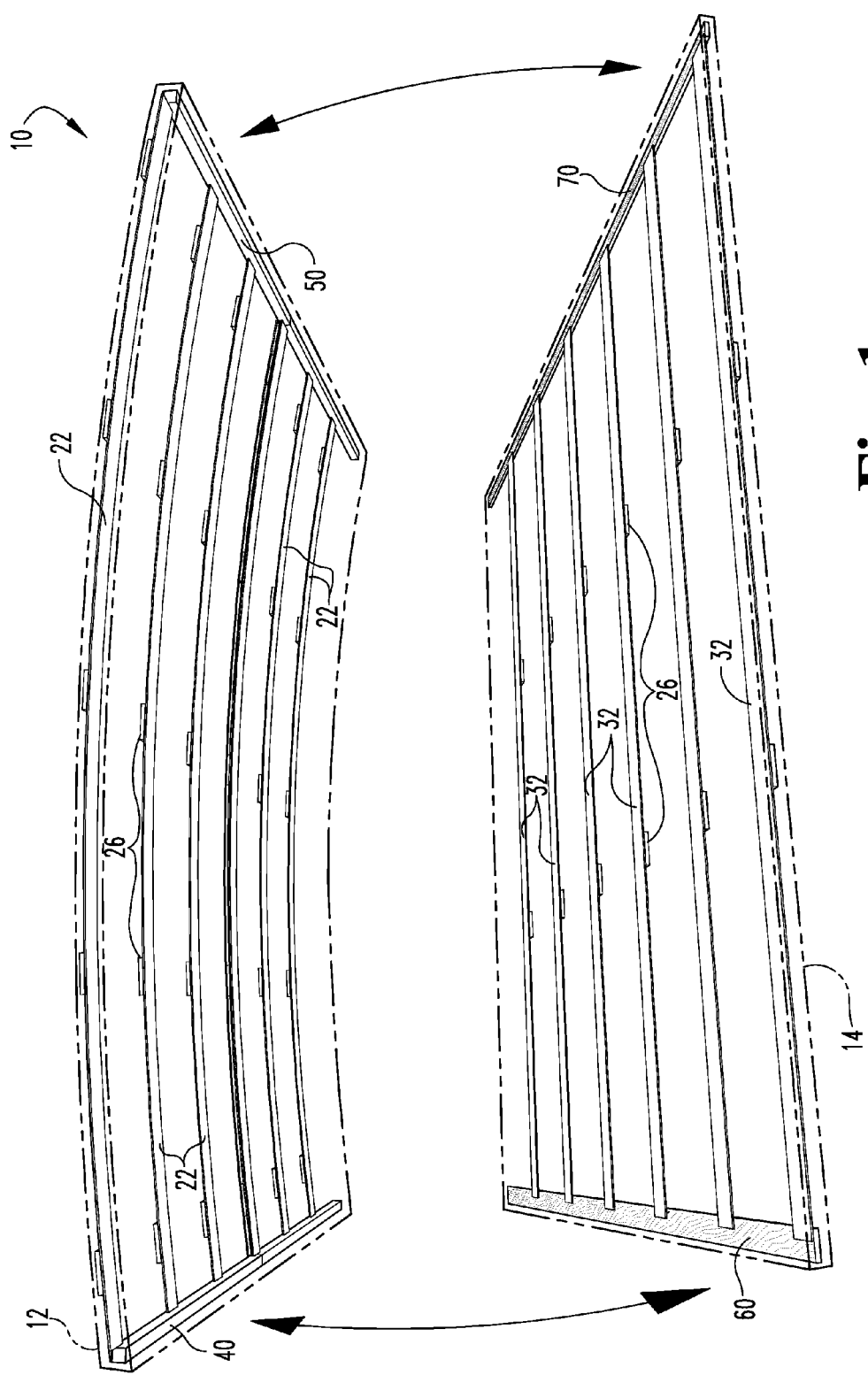
FIG. 1 is a perspective view of a roofing-ceiling system truss components according to one embodiment of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF EMBODIMENTS OF THE PRESENT INVENTION

The embodiments disclosed below are not intended to be exhaustive or limit the invention to the precise form disclosed in the following detailed description. Rather, the embodiments are chosen and described so that others skilled in the art may utilize their teachings.

Embodiments of the invention have several features that make the prefabricated roofing components particularly suited for use in recreational vehicles and manufactured housing. Typically, roofing and ceiling systems have several elements that must be manufactured and then assembled in a rather specific configuration. In conventional building construction, roofing and/or ceiling systems may be more flexible because components may be varied and individual components compensated at the construction site to make a roofing system work for a particular structure. In comparison, recreational vehicles and manufactured housing have more uniform structures that facilitate mass production. Unfortunately, that may also result in a uniformity that is more difficult to recreate with every iteration of a roofing and/or ceiling assembly. Fortunately, these features of embodiments of the invention provide a uniform roofing/ceiling assembly that may be mass produced and also interface with conventional recreational vehicle and manufactured housing structures.

Figure 2:
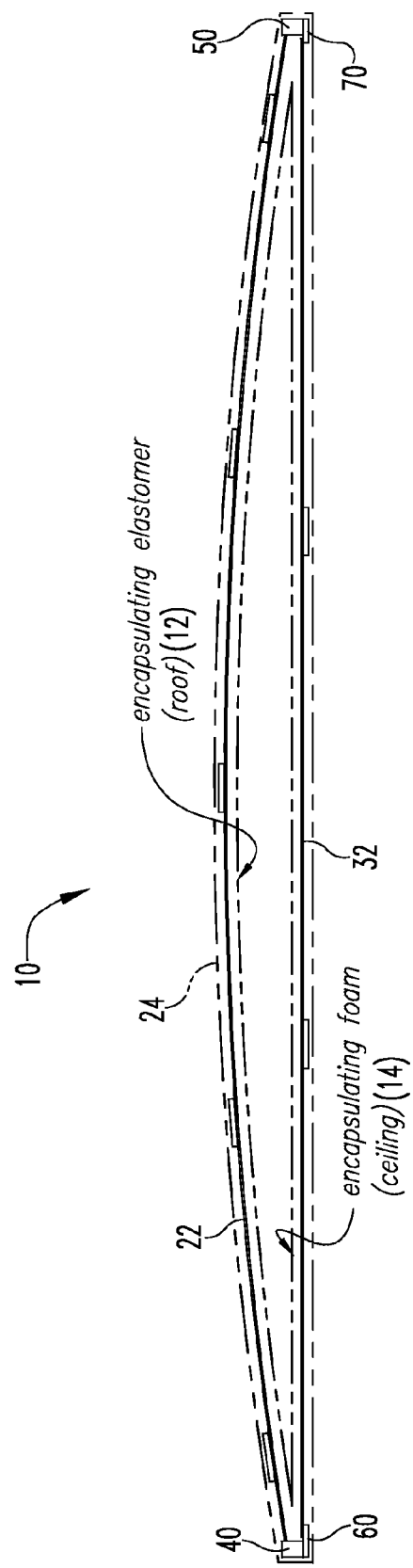
FIG. 2 is a cross-sectional view of a roofing-ceiling system according to one embodiment of the present invention.
Figure 3:
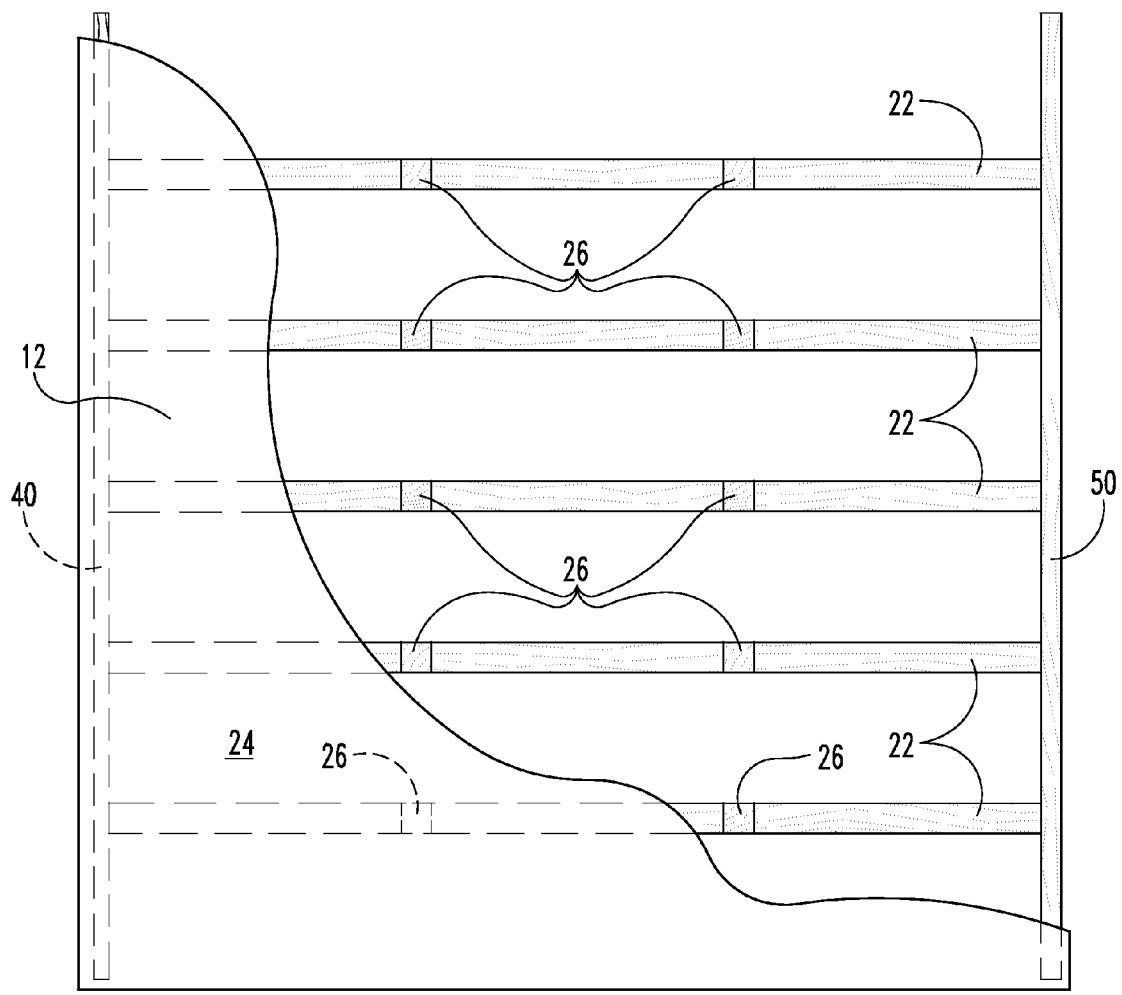
FIG. 3 is a top plan view of a roofing system component in partial cut-away according to one embodiment of the invention.

In one embodiment, shown in FIGS. 1-3, roofing/ceiling system 10 includes a truss support arrangement encapsulated within composite material. In the embodiment of FIG. 1, the underlying initial starting structural components (such as panels 12 and 14, strips 22 and 32, optional stand offs 26, and square rods and 50) are shown in solid form, with the understanding that the final product has those components encapsulated in a layer of a second composite material shown by the outline boxes for roof 12 and ceiling 14. System 10 includes roof section 12 generally defined by strips 22 extending from cross-bar 40 to cross-bar 50. Roof 12 encapsulates strips 22 and cross-bars 40 and 50 to provide a generally unitary upper surface. In one embodiment, there is only one roof panel 12, while in other embodiments there may be two roof panels 12 covering opposite halves, or multiple roof panels 12 covering several panels. Roof panel 12 extends over strips 22, and in the illustrated embodiment have at spaced intervals over strips 22 one or more stand offs 26, disposed periodically along strips 22 to space strips 22 from the surface of roof panel 12. System 10 further includes ceiling section 14, with strips 32 extending between cross-bars 60 and 70 with one or more stand offs 26 disposed at spaced intervals under strips 32, providing the top of the interior of the manufactured housing or recreational vehicle (not shown in FIG. 1).

In one embodiment, strips 22 are arched with an apex at a median point on the upper surface of roof section 12. In another embodiment (not shown), strips are straight and form an angle at the median point on upper surface 24 of roof section 12. In some embodiments of the invention, roof section 12 may only include a plurality of strips 32, with elastomer completing outer surface 24. In other embodiments of the invention, although roof panels 12 are included for the exterior roof, further shaping of exterior portion 24 of roof section 12 may be made by the molding of the second composite material within the shape of the mold (not shown in FIGS. 1-3). Additionally, further coatings or coverings may be added over roof panel 12 and exterior composite surface 24. In embodiments of the invention designed for manufactured housing, for example, conventional roofing material may be added to the mold to be included in the final molded roof section 12, or alternatively the exterior shape of outer surface 24 may be configured for accommodating other conventional roofing material, for example one or more wood boards (not shown) to which shingles may be nailed. In embodiments of the invention designed for recreational vehicles, for example, an aerodynamically configured shape may be imparted to exterior contour 24 of roof section 12 when used with a motor vehicle.

In embodiments of the invention, the second composite material includes an elastomer such as an unsaturated rubber that may be cured by sulfur vulcanizations (e.g., natural polyisoprene, synthetic polyisoprene, polybutadiene, chloropene rubber, butyl rubber, styrene-butadiene rubber, and/or nitrile rubber), saturated rubbers (e.g., ethylene propylene rubber, epichlorohydin rubber, polyacrylic rubber, silicone rubber, fluorosilicone rubber, a fluoroelastomer, a perfluoroelastomer, a polyether block amine, chlorosulfonated phlyethylene, ethylene-vinyl acetate), thermoplastic elastomers, polysulfide rubber, elastolefin, and the proteins resilin and elastin. In addition, fiberglass and other solids and chemicals may be mixed with the elastomer to enhance the durability, structure, and/or other characteristic of the elastomeric material.

Strips 22 and 32, stand-offs 26, and cross-bars 40 and 50 are interior structural components of roof section 12 and/or ceiling section 14. In one embodiment, such structural components are made of conventional building materials, for example, wood, fiberboard, plywood, hard plastic, ceramics, copper, aluminum, steel, or other similar material. Except for stand-offs 26, the structural components have an elongated structure so that forces acting on the surface of roof section 12 and/or ceiling section 14 are distributed across the length of the structural component. Optionally, each structural component has a roughed or corrugated surface to promote the connection of the elastomeric material to the structural component so that any forces acting on the exterior of roof section 12 and/or ceiling section 14 are distributed along the elongated structural components. In contrast, stand-offs 26 serve more of a truss-like function, where focused application of force at the point of one of stand-offs 26 and distribute such force to the abutting strip 22 or 32.

Figure 4:
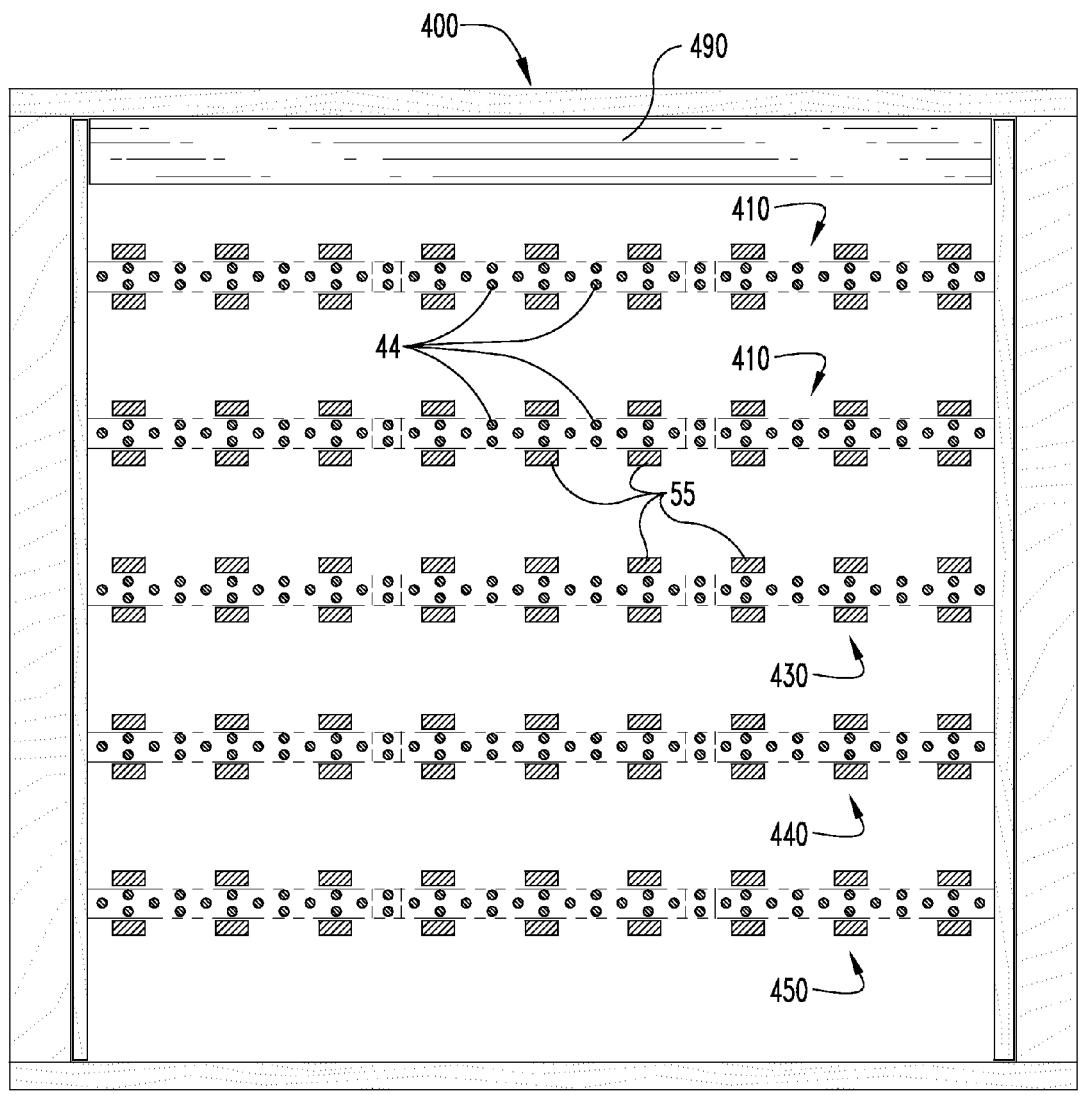
FIG. 4 is a top plan view of a mold for a method of constructing roofing/ceiling system components according to an embodiment of the present invention.
Figure 5:
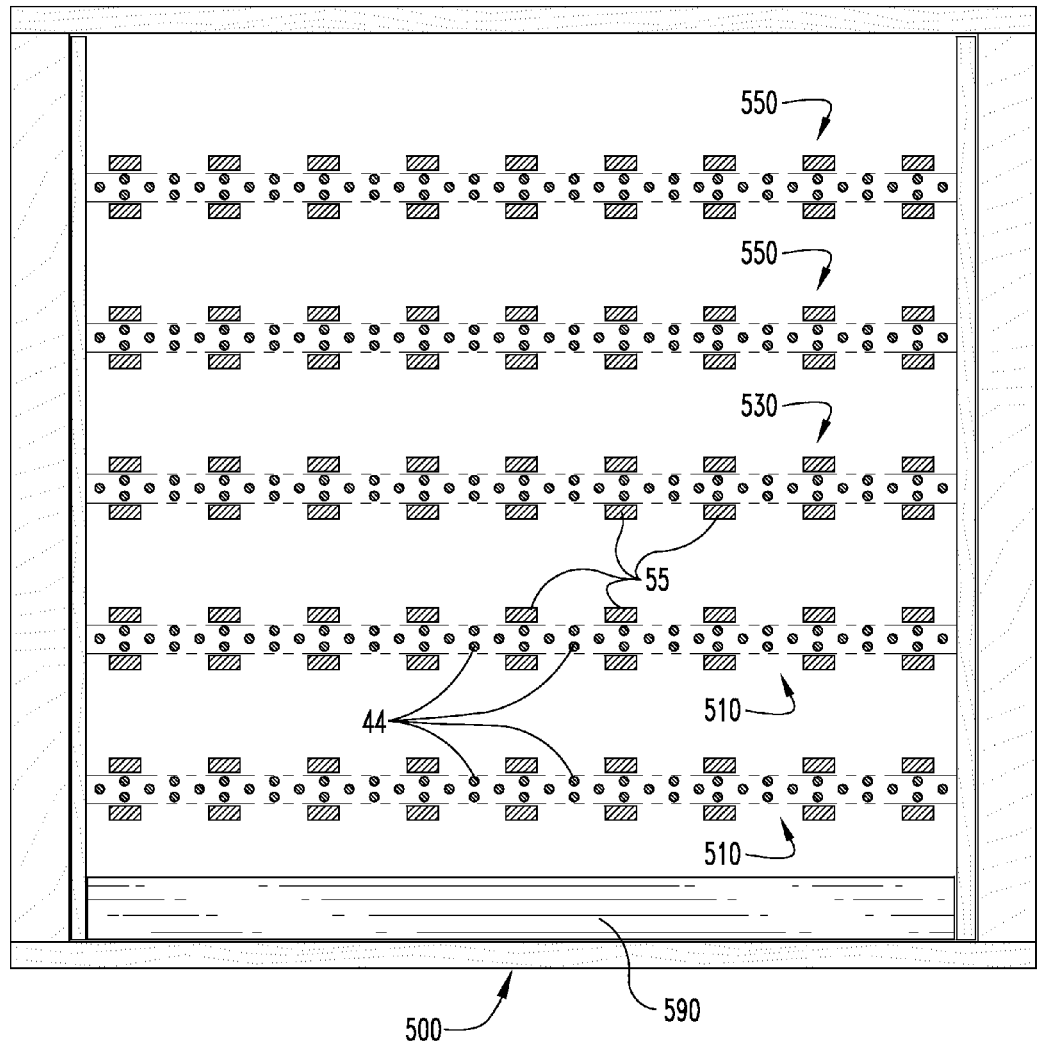
FIG. 5 is a top plan view of a mold with an insert for a method of constructing roofing/ceiling system components according to an embodiment of the present invention.

To assemble roof section 20, first roof panel(s) 24 are placed in mold 400 or 500 (see FIGS. 4 and 5), then stand-offs 26 are placed at intervals, and strips 22 then placed across roof panel(s) 24. Although not shown in FIGS. 4 and 5, strips 22 and stand-offs 26 may be positioned upon pins 44 and slats 55 within mold 400 or mold 500. Both pins 44 and slats 55 are movable between being flush with the bottom surface of mold 400 and mold 500, and various levels of extension above the surface of mold 400 and 500.

One of strips 22 may be placed and retained within strip row 410, wherein strip row 410 includes a plurality of slats 55 disposed in two lines, A and B, of slats 55, with a plurality of pins 44 disposed between lines A and B. In operation, slats 55 are extended upward to a first height, and pins 44 are extended to a second, lower height. One of strips 22 may be placed between lines A and B, and thereby held above the surface of mold 400. Optionally, stand-offs 26 may be further positioned atop strip 22 and between lines A and B. Once mold 400 is covered by a mating mold (not shown), the second composite material, for example an elastomer, for example in the form of a foam, may be injected or sprayed into mold 400 and pressurized to an extent such that pins 44 and slats 55 remain in position, with the void created by the retracting pins 44 and slats 55 being filed with excess material. In this way, mold 400 may receive slats 22 and position them appropriately for the finished roofing-ceiling product.

In addition, once strips 22 are placed within mold 400, cross-bars 40 and 50 may optionally be placed over the ends of strips 22. Elastomer in the form of foam is then disposed, e.g. via spraying or injection, to encapsulate all sub-components of roof section 20 to create a unitary structure. In some embodiments, cross-bars 40 and 50 may be placed across several strips 22 without any connecting mechanism. In other embodiments, additional pins (not shown) may be used to locate cross-bars 40 and 50 relative to strips 22. In still other embodiments, cross-bars 40 and 50 may be attached to one or more of strips 22 by glue, nails, or other connecting mechanism prior to the injection of the pressurized elastomeric material within the mold. Optionally, cross-bars 40 and 50 may be generally perpendicularly disposed with relation to strips 22, which are generally in a parallel orientation.

In one embodiment, one side of roof section 20 has an indented portion and the other side of roof section 20 has an extending portion (e.g., FIG. 6A), so that two or several roof sections 20 may be interfit along those sides. To form indented portion 606 shown in FIG. 6A, mold 400 may optionally include inset 490 to create indenture 602. For the complementary extension 604, optional inset 590 may be positioned within mold 590 above its surface to form indenture 608 which receives extension 606 of roof/ceiling section 600.

The embodiment of FIG. 2 has ceiling portion 110 which includes generally rectangular flat panel 112 with end beams 140 and 150 extending parallel on opposite sides of panel 112. To provide a truss-like structure, cross-beams 120 extend from end beam 140 to end beam 150, with stand-offs 130 providing a physical barrier to prevent cross-beams 120 from sagging to panel 112.

The various components of ceiling portion 110 are assembled in a mold for the application of foam. First panel 112 is placed in the mold and then end beams 140 and 150 are positioned on opposite edges of panel 112. Next, cross-beams 120 are placed to span between end beams 140 and 150, with stand-offs 130 being placed between cross-beams 120 and panel 112 at intervals. Generally, to provide enhanced support, cross-beams extend over at least half of the width of each end beam 140 and 150. Once all are arranged in a mold, foam is deposited, e.g. by spraying or injection, so that those various items are held together and create a supporting structure equivalent to a truss.

In one embodiment, sprayed polyurethane foam (SPF) is used for its various properties, including but not limited to: the properties of being a water barrier; its relatively light weight; its ability to resist weather: wind, rain, sun; its thermal insulation effect for the structure interior; and its adhesive properties. Conventionally used as a roofing sealant and/or insulator, or a component material for a structural piece, with the present invention such polyurethane material is used as both a sealant and an adhesive in addition to being a structural component that is enhanced by the supporting strips and beams in the roof and ceiling.

Figures 6, 6A:
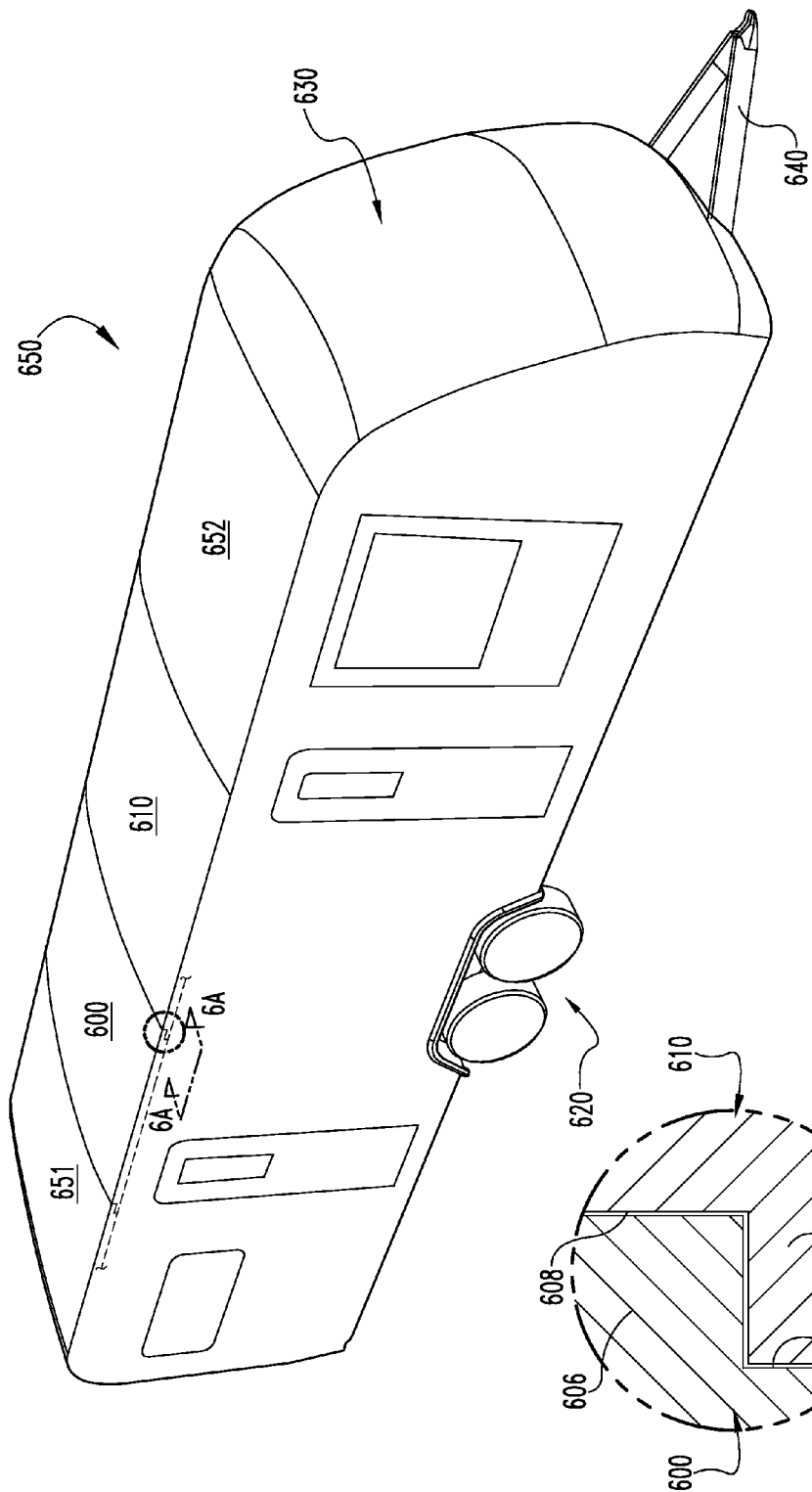

FIG. 6 shows an embodiment of the invention where roof/ceiling sections 600, 610, 651, and 652 provide the majority of the upper covering of recreational vehicle 650. Each abutting ones of the roof/ceiling sections may be formed as shown and previously described in relation to FIG. 6A, optionally some of the roof/ceiling sections may have flat ends and be otherwise connected to recreational vehicle body 630. In the embodiment shown, recreational vehicle has a pair of support wheels 620 and a trailer end 640 for connection to a conventional hitch (not shown). However, other embodiments of the invention involve self-propelled recreational vehicles, e.g. motor homes and converted buses, while other embodiments of the invention may be used on stationary housing such as manufactured housing. Although not shown in FIG. 6, often recreational vehicles have heating and/or air conditioning units attached to the roof, and may also support a limited amount of storage, for example between a roof and a ceiling section.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A roofing or ceiling assembly structured and arranged for attachment to a predetermined vehicle or manufactured housing structure comprising:
    a frame comprising a plurality of structural members made of a first material, the plurality of structural members being encapsulated within a second composite material, said second composite material extending in substantially the entire space defined by said frame, said frame having a roof side configured to function as an exterior roof surface for the structure, the roof side being arched and including arched structural members, and having a ceiling side configured to function as an interior ceiling surface for the structure.

2. The assembly of claim 1 wherein the plurality of structural members are arranged to create a truss-like structure within said second composite material.

3. The assembly of claim 1 wherein the plurality of structural members includes a plurality of strips.

4. The assembly of claim 3 wherein the plurality of structural members includes at least once cross-bar, and the plurality of strips are arranged such that the at least one cross-bar is disposed cross-wise of one other strip.

5. The assembly of claim 4 wherein the plurality of strips are arranged in a general parallel orientation and the at least one cross-bar is generally perpendicular to the plurality of strips which are disposed in a general parallel orientation.

6. The assembly of claim 1 further comprising a second frame comprising a plurality of structural members encapsulated within a second composite material, said frame and said second frame interfitting to form a roof or ceiling.

7. The assembly of claim 1 wherein the assembly is configured to be disposed on the top of a recreational vehicle.

8. The assembly of claim 1 wherein the second composite material comprises an elastomer.

9. The assembly of claim 8 wherein the elastomer is mixed with fiberglass.

10. The assembly of claim 3 wherein the plurality of structural members includes a plurality of standoffs disposed abutting said strips.

11. A method of manufacturing a roof or ceiling for manufactured housing or a recreational vehicle comprising the steps of:
arranging a plurality of structural members within a mold defining the exterior of the roof or ceiling; and
providing a second composite material within the mold to encapsulate the structural members, said second composite material extending in substantially the entire space defined by said mold so that the frame has a roof side configured to function as an exterior roof surface for the structure, the roof side being arched and including arched structural members, and a ceiling side configured to function as an interior ceiling surface for the structure.

12. The method of claim 11 wherein during the arranging step, the plurality of structural members are arranged to create a truss-like structure within the second composite material.

13. The method of claim 11 wherein the plurality of structural members include a plurality of strips.

14. The method of claim 13 wherein the plurality of strips are arranged such that at least one board is disposed crosswise of one other strip.

15. The method of claim 14 wherein the plurality of boards are arranged in a general parallel orientation and the at least one strip is generally perpendicular to the other strips which are disposed in a general parallel orientation.

16. The method of claim 11 further comprising the steps of arranging a second frame comprising a plurality of structural members encapsulated within a second composite material, wherein said frame and said second frame are structured and arranged to interfit to form a roof or ceiling.

17. The method of claim 11 wherein the shape of the mold is configured to create an assembly structured and arranged to be disposed on the top of a recreational vehicle.

18. The method of claim 11 wherein the second composite material comprises an elastomer.

19. The method of claim 18 further comprising the step of mixing fiberglass with the elastomer prior to encapsulation.

20. The method of claim 11 wherein the plurality of structural members includes a plurality of standoffs disposed on said strips.

* * * * *